(12) United States Patent
Lardy et al.

(10) Patent No.: US 9,488,180 B2
(45) Date of Patent: Nov. 8, 2016

(54) EFFICIENT AND RELIABLE SUBSEA COMPRESSION SYSTEM

(75) Inventors: Pascal Lardy, Houston, TX (US); William C. Maier, Almond, NY (US)

(73) Assignee: Dresser-Rand Company, Olean, NY (US)

( * ) Notice: Subject to any disclaimer, the term of this patent is extended or adjusted under 35 U.S.C. 154(b) by 131 days.

(21) Appl. No.: 14/239,213

(22) PCT Filed: Aug. 20, 2012

(86) PCT No.: PCT/US2012/051535
§ 371 (c)(1),
(2), (4) Date: Jun. 17, 2014

(87) PCT Pub. No.: WO2013/028594
PCT Pub. Date: Feb. 28, 2013

(65) Prior Publication Data
US 2015/0159662 A1    Jun. 11, 2015

Related U.S. Application Data

(60) Provisional application No. 61/526,905, filed on Aug. 24, 2011.

(51) Int. Cl.
*C25B 1/04* (2006.01)
*F04D 25/06* (2006.01)
*F04D 29/08* (2006.01)
*F04D 29/12* (2006.01)
*F04D 17/10* (2006.01)
(Continued)

(52) U.S. Cl.
CPC ............. *F04D 25/0686* (2013.01); *C25B 1/04* (2013.01); *F04D 17/10* (2013.01); *F04D 29/058* (2013.01);
(Continued)

(58) Field of Classification Search
CPC ........... F04D 25/0686; F04D 29/5806; F04D 17/10; F04D 29/058; F04D 29/104; F04D 29/5826; F04D 29/5833; F04D 29/083; F04D 29/124; C25B 1/04
USPC .................................................. 277/431, 432
See application file for complete search history.

(56) References Cited

U.S. PATENT DOCUMENTS 5,382,141 A    1/1995    Stinessen
6,548,924 B2 *  4/2003    Furukawa et al. ........... 310/68 C
(Continued)

FOREIGN PATENT DOCUMENTS

EP         1914429 A2     4/2008
WO      2008-002148 A1    1/2008
WO   WO 2009024740 A1 *  2/2009  ............. F04D 27/02

OTHER PUBLICATIONS

PCT/US2012/051535—International Search Report and Written Opinion mailed Feb. 19, 2013 (7 pages).

*Primary Examiner* — Peter J Bertheaud
*Assistant Examiner* — Dnyanesh Kasture

(57) ABSTRACT

A system, method, and apparatus for compressing a process fluid are provided. The system includes a sealed housing configured to be submerged in a body of water, and a compressor disposed in the sealed housing and including a compressor casing, the compressor being configured to compress a process fluid. The system also includes a motor operably coupled to the compressor and disposed in the sealed housing, the motor being configured to drive the compressor. The system further includes a source of hydrogen, such as a hydrogen generator, disposed in the sealed housing or submerged and disposed proximate thereto, the source of hydrogen being fluidly coupled with the compressor and configured to provide the hydrogen gas thereto.

12 Claims, 4 Drawing Sheets

(51) Int. Cl.
*F04D 29/058* (2006.01)
*F04D 29/10* (2006.01)
*F04D 29/58* (2006.01)

(52) U.S. Cl.
CPC ........... *F04D 29/083* (2013.01); *F04D 29/104* (2013.01); *F04D 29/124* (2013.01); *F04D 29/5806* (2013.01)

(56) References Cited

U.S. PATENT DOCUMENTS

| | | | | |
|---|---|---|---|---|
| 8,555,977 | B2* | 10/2013 | Aykens | 166/344 |
| 2008/0107547 | A1* | 5/2008 | Kaminski et al. | 417/366 |
| 2008/0260539 | A1* | 10/2008 | Stinessen et al. | 417/26 |
| 2010/0258449 | A1* | 10/2010 | Fielder | 205/628 |

* cited by examiner

EFFICIENT AND RELIABLE SUBSEA COMPRESSION SYSTEM

The present application is a national stage application of PCT Application Serial No. PCT/US2012/051535, filed Aug. 20, 2012, which claims priority to U.S. Provisional Patent Application Ser. No. 61/526,905, which was filed Aug. 24, 2011. These priority applications are hereby incorporated by reference in their entirety into the present application, to the extent these priority applications are not inconsistent with the present application.

BACKGROUND

In many offshore oil and gas applications, it is desirable to position machinery at or near the ocean floor. Designing complex industrial machinery to operate reliably and efficiently in underwater environments, however, presents significant challenges, such as protecting the machinery from the underwater environment. Further, these challenges can be complicated by a requirement that the machinery be designed to handle dirty or sour process gases, such as natural gas. A variety of designs have been proposed and implemented to overcome these challenges and protect the machinery from the subsea environment, while effectively operating with difficult process gases. As wellheads are pushed into deeper water, however, these challenges are compounded by higher hydrostatic pressure and an increased difficulty of reaching machinery disposed at location. For example, design steps are needed to minimize maintenance requirements as the components of the deepwater machinery may be difficult and costly to reach if a problem arises.

Some designs currently implemented use a compact, integrated motor/compressor, such as the DATUM® I, commercially-available from Dresser-Rand Co. of Olean, N.Y., USA. These current designs utilize ruggedized and/or corrosion-resistant construction suitable for marine environments and for handling difficult process gases. While such designs have been successful in a variety of applications, a need exists for a design solution that employs readily-available, efficient, and reliable machinery, which can be positioned subsea and can run with a minimal amount of support and maintenance from the surface.

SUMMARY

Embodiments of the disclosure may provide an exemplary compression system. The system includes a sealed housing configured to be submerged in a body of water, and a compressor disposed in the sealed housing and including a compressor casing, the compressor being configured to compress a process fluid. The system also includes a motor operably coupled to the compressor and disposed in the sealed housing, the motor being configured to drive the compressor. The system further includes a source of hydrogen disposed in the sealed housing or submerged and disposed proximate thereto, the source of hydrogen being fluidly coupled with the compressor and configured to provide the hydrogen gas thereto.

Embodiments of the disclosure may also provide an exemplary method for subsea operation of a compressor. The method includes isolating the compressor from a subsea environment by positioning the compressor in a sealed housing, and driving the compressor with a motor disposed in the sealed housing. The method further includes electrolyzing water with a hydrogen generator to produce hydrogen gas, the hydrogen generator being disposed at least partially in the sealed housing or submerged in the subsea environment and disposed proximate to the sealed housing. The method also includes filling the sealed housing with the hydrogen by providing the hydrogen gas to one or more gas seals in the compressor.

Embodiments of the disclosure may also provide an apparatus for compressing a process fluid. The apparatus includes a sealed housing, and a compressor disposed in the sealed housing and configured to compress the process fluid. The apparatus also includes a motor disposed in the sealed housing and configured to drive the compressor, and a hydrogen generator disposed at least partially in or submerged and disposed proximate to the sealed housing and configured to supply hydrogen gas to the compressor and the interior of the sealed housing. The apparatus further includes a gas-gas cooler configured to transfer heat from the motor to the process fluid.

BRIEF DESCRIPTION OF THE DRAWINGS

The present disclosure is best understood from the following detailed description when read with the accompanying Figures. It is emphasized that, in accordance with The standard practice in the industry, various features are not drawn to scale. In fact, the dimensions of the various features may be arbitrarily increased or reduced for clarity of discussion.

DETAILED DESCRIPTION

Figure 1:
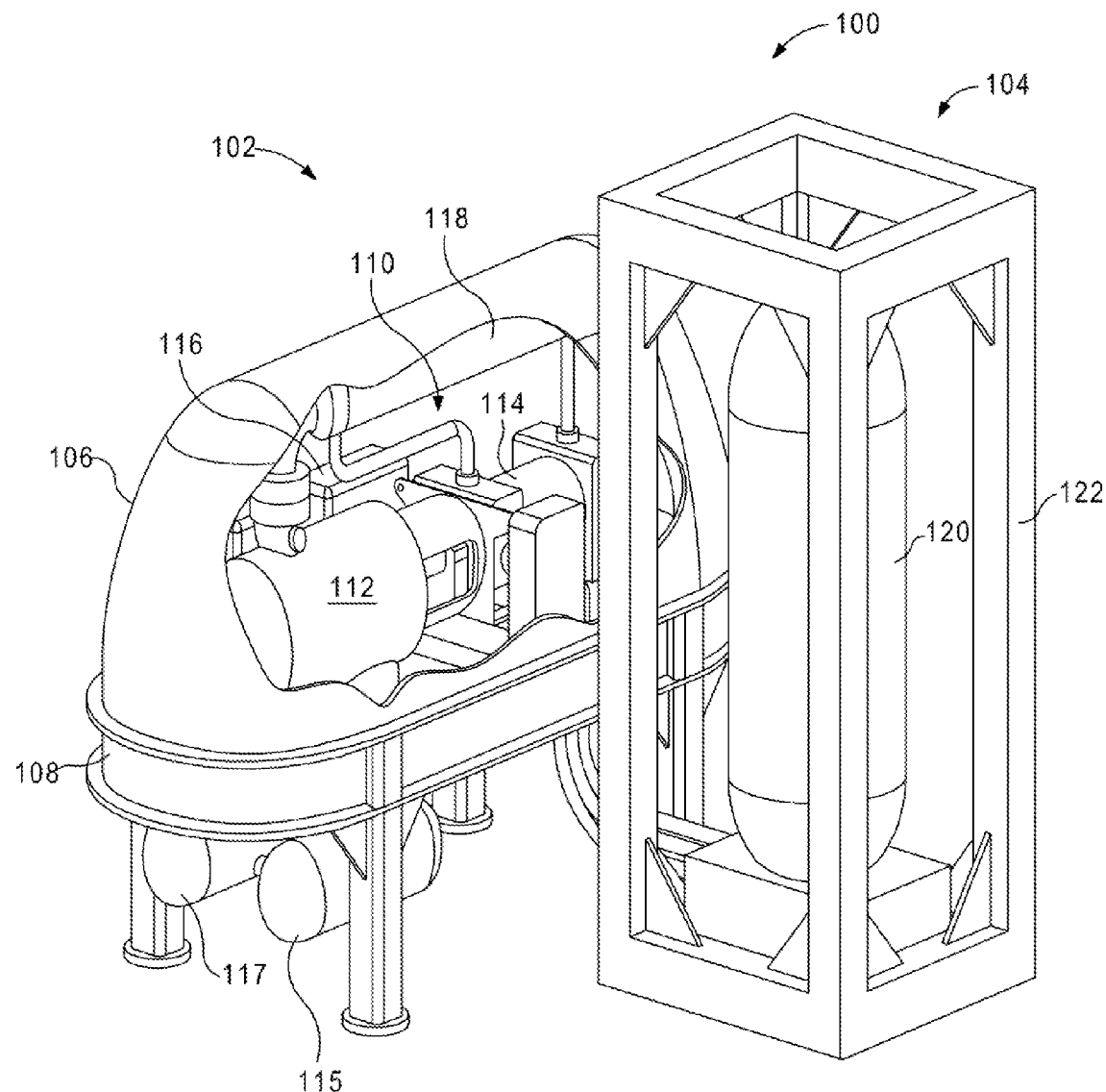
FIG. 1 illustrates a raised perspective view of an exemplary compact compression system, according to an embodiment.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a raised perspective view of an exemplary compact compression system 100, according to an embodiment. The compression system 100 may be tailored for use in subsea applications, and may be configured to employ internal components rated for topside use, as will be described in greater detail below. Although generally described herein for use in subsea applications, it will be appreciated that the compression system 100 may be employed in other situations in which it is desirable to isolate the internal components from the surrounding environment.

The exemplary compression system 100 generally includes a compression package 102 and a power-delivery package 104. The compression package 102 includes a sealed housing, which, as shown, may be provided by a cover 106 and a stand 108. For illustrative purposes, the cover 106 is shown partially broken-away to reveal the internal components of the compression package 102. The cover 106 is constructed of a composite material, steel, and/or any other rigid material suitable for the environment (e.g., subsea) in which the compression system 100 is intended to be used. The cover 106 may be coupled to the stand 108 so as to form a seal therebetween, thereby enclosing the interior components of the compression package 102 in a protective cocoon. The stand 108 is also constructed of rigid material, such as steel or another suitable material, and may be configured to be anchored to the bottom of the body of water via any suitable mooring devices and methods. In some embodiments, the cover 106 may be dome-shaped, as shown, but in other embodiments may have a flat top, or be a cylinder, cube, or other enclosed geometry and, as such, may obviate the need for at least a portion of the stand 108.

The internal components of the compression package 102, i.e., those sealed and disposed in an interior 110 of the compression package 102, generally include a compressor 112 and a motor 114. As shown, the motor 114 and compressor 112 may be stand-alone units, coupled together via one or more shafts, couplings, and/or gear boxes (none shown), as deemed necessary by one with skill in the art. In other embodiments, the compressor 112 and motor 114 may be integral, that is, disposed in a common casing, but may still include one or more shafts, couplings, and/or gear boxes disposed therebetween.

The compression package 102 also includes a source of hydrogen, for example, a hydrogen generator 116. In an exemplary embodiment, the hydrogen generator 116 may be disposed at least partially within the cover 106. In another exemplary embodiment, the hydrogen generator 116 may be disposed outside of the cover 106. In such an embodiment, the hydrogen generator 116 may be disposed in a separate housing and submerged subsea to a location proximate to the cover 106, i.e., close enough to convey generated hydrogen gas to the interior 110 via tubing, pipes, or any other suitable gas conduit. The hydrogen generator 116 is fluidly coupled to a source of water, which is generally provided by the environment surrounding the cover 106 in subsea applications. The hydrogen generator 116 is configured to receive the water and disassociate the hydrogen from the oxygen in the water, e.g., through electrolysis. The oxygen may then be vented back to the surrounding environment, or may be offloaded for other applications. In various exemplary embodiments, the source of hydrogen may be or include supply tanks (not shown) which may be positioned in the interior 110 and/or outside of the cover 106, and which may be charged at or from the surface or by the hydrogen generator 116. Further, in some embodiments, the source of hydrogen may be (e.g., recycled) located at the surface and supplied to the compression system 100 via an umbilical.

The hydrogen generator 116 may be configured to supply hydrogen gas to the various components of the compression package 102. For example, the hydrogen generator 116 may supply the hydrogen gas to seals (not shown) in the compressor 112, as described in further detail below. The hydrogen gas from the seals may then proceed out of the compressor 112 and into the interior 110 of the sealed housing, thus providing a clean hydrogen environment for the interior components of the compression package 102. In some embodiments, the hydrogen generator 116 may supply hydrogen directly to the interior 110, in addition to or in lieu of providing it thereto via the seals.

The hydrogen gas supplied to the interior 110 (e.g., via the seals) may be delivered at a desired pressure, for example, at topside pressure (e.g., below the hydrostatic pressure of a subsea location), which may allow for the compressor 112, the motor 114, and/or any other components to be designed for use in topside environments. This may provide for use of more traditional, standard equipment than is typically used in high-pressure subsea environments. Such topside-rated equipment may be more efficient, reliable, and/or easy to maintain.

In another exemplary embodiment, the hydrogen gas may be provided at a pressure generally equivalent to the pressure external to the sealed housing (e.g., at hydrostatic subsea pressure), or at a pressure above the pressure external to the sealed housing. For example, the hydrogen generator 116 may be configured to provide gas at about 1000 psi, or more, to the interior 110. Moreover, the hydrogen gas from the hydrogen generator 116 may be further pressurized prior to delivery into seals and/or the interior 110 and thus may be supplied thereto at pressures exceeding the process fluid pressure in the compressor 112. Such additional pressurization may be provided by any suitable pressurization device such as a secondary, hydrogen compressor, a barometric compensating device coupled to the compressor 112, or the like. This may provide a pressure differential that prevents process fluids in the compressor 112 from leaking past the seals in the compressor 112 and into the interior 110, as the pressure in the interior 110 is greater than the pressure in the process fluid flowpath. This may prove advantageous by avoiding any potential migration of dirty and/or corrosive process fluid into the clean environment of the interior 110.

The compression package 102 may also include a gas-gas cooler 118. The gas-gas cooler 118 may be disposed upstream (as shown) or downstream of the compressor 112 and fluidly coupled thereto such that process fluid is delivered to the compressor 112 via the gas-gas cooler 118 or received in the gas-gas cooler 118 from the compressor 112. Although not shown, in some embodiments, a portion of the process fluid flow may be received through the gas-gas cooler 118, while another portion may bypass the gas-gas cooler 118. The gas-gas cooler 118 may also be fluidly coupled to a cooling circuit for the motor 114, as will be described in greater detail below. Additional details regarding an exemplary implementation of the gas-gas cooler 118 may be provided in co-pending U.S. Provisional Patent Application Ser. No. 61/491,977, the entirety of which is incorporated herein by reference to the extent consistent with the present disclosure. The compression package 102 may also include an additional cooling system (not shown) to offload heat from the interior 110, generated by the compressor 112, the motor 114, or other components, to the surrounding environment.

The compression package 102 may further include one or more gas break vessels (two are shown: 115, 117). The gas break vessels 115, 117 may be coupled to the compressor 112, the cover 106, and/or the stand 108, as shown, although any other position for the gas break vessels 115, 117 is within the scope of this disclosure. The gas break vessels 115, 117 may be disposed outside of the sealed housing, thereby reducing the required volume of the interior 110 of the sealed housing. Further, the gas break vessels 115, 117 are sized and configured to be fluid-tight and to maintain a desired pressure therein. Moreover, the compressor 112 may include an internal separator, such as a rotary separator, a static separator (e.g., a swirl-tube and/or static separating turn), or a combination thereof, which may be fluidly coupled to the gas break vessels 115, 117. The gas break vessels 115, 117 may be configured to enable drainage of liquid out of the compressor 112, e.g., via the separator, while preventing excessive egress of gas from the process fluid flowpath via the separator.

Turning now to the power-delivery package 104, the power-delivery package 104 may include components capable of supplying power at optimum conditions to the motor 114. One example of such a component is a variable frequency drive (VFD), which may be disposed in a fluid-tight vessel 120. The VFD may be electrically coupled to the motor 114 so as to provide low-frequency, low-voltage power to the motor 114 during start-up, while ramping up frequency and voltage thereafter. Details of the structure and operation of VFDs are well-known to those skilled in the art and will not be described herein in detail. Further, the fluid-tight vessel 120 may be supported on a frame 122 and, for example, anchored to the ocean floor or another structure proximal the compression package 102. In an embodiment, the fluid-tight vessel 120 may be pressurized at topside conditions and maintained at this pressure subsea. Accordingly, the VFD may be or include components rated for topside operation, rather than ruggedized for deep-sea applications. In other embodiments, however, the pressure in the fluid-tight vessel 120 may be at ambient, subsea pressure or may be at higher pressures.

In some embodiments, the VFD may be housed in the sealed housing, e.g., under the cover 106 of the compression package 102, and may or may not require a separate fluid-tight vessel 120. For example, the fluid-tight vessel 120 may be disposed under the cover 106, or may be omitted entirely. However, disposing the VFD in a separate fluid-tight vessel 120, outside of the sealed housing, may reduce the load on the internal cooling system (not shown) of the compression package 102.

Figure 2:
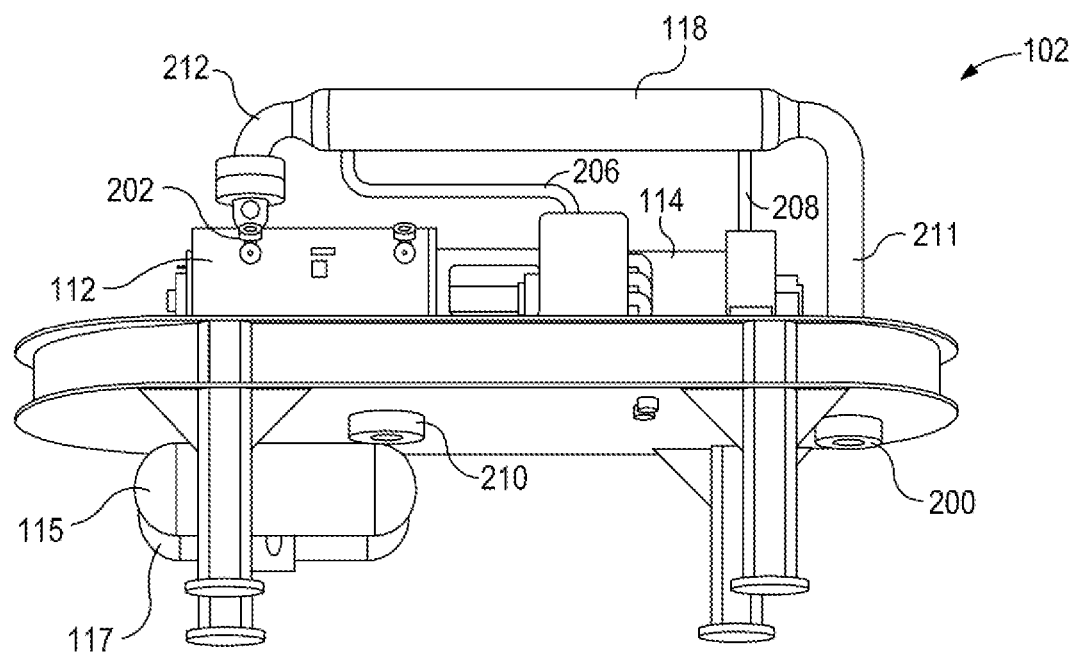
FIG. 2 illustrates a lowered perspective view of the compact compression system, with the cover and power-delivery package removed for illustrative purposes, according to an embodiment.
Figure 3:
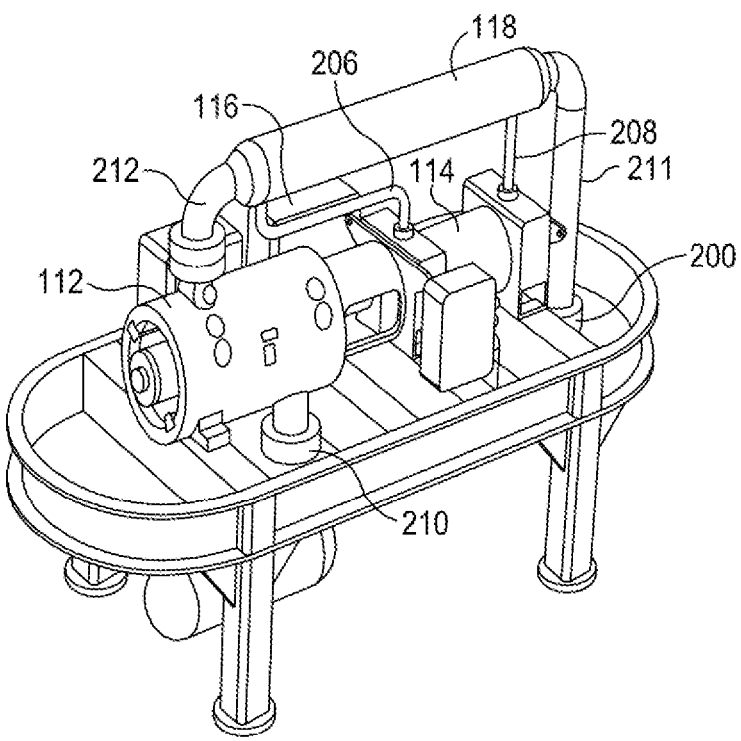
FIG. 3 illustrates a raised perspective view of the compact compression system, with the cover and power-delivery package removed for illustrative purposes, according to an embodiment.

FIGS. 2 and 3 illustrate a lowered perspective view and a raised perspective view, respectively, of the compression package 102, according to an exemplary embodiment, with the cover 106 (FIG. 1) removed to fully expose the interior 110 (FIG. 1) for illustrative purposes. As shown, the gas-gas cooler 118 is disposed between an inlet 200 of the compression package 102 and an inlet 202 of the compressor 112. More particularly, the gas-gas cooler 118 receives process fluid from the package inlet 200 via a line 211. The process fluid is then transported through the gas-gas cooler 118 and to the compressor inlet 202 via a line 212.

The gas-gas cooler 118 may provide at least two flow-paths therein, one for process fluid entering through the inlet 200 of the compression package 102 via the line 211 and travelling toward the inlet 202 of the compressor 112 via the line 212, and one for the cooling gas received from the motor 114 via a line 206 and directed back to the motor 114 via a line 208. Accordingly, heated cooling fluid in the line 206 may be cooled in the gas-gas cooler 118 and then delivered back to the motor 114 via the line 208. The flow of cooling fluid through the gas-gas cooler 118 may be counter-flow, cross-flow, or any other suitable arrangement. Further, the flow direction for the cooling fluid may be reversed, such that fluid is received into the motor 114 via the line 206 and delivered to the gas-gas cooler 118 via line 208. As such, the process fluid is used as a heat-sink for cooling the motor 114.

The cooling fluid for the motor 114 may be hydrogen gas supplied to the interior 110 by the hydrogen generator 116. Accordingly, the motor 114 may take hydrogen gas in directly from the interior 110, cool it via the gas-gas cooler 118, and then allow it to course through the motor 114 to cool the motor 114. In another exemplary embodiment, the motor 114 may take in hydrogen gas, immediately use it for cooling, and then cool the hydrogen gas in the gas-gas cooler 118 prior to allowing it to re-enter the interior 110. In some other exemplary embodiments, the cooling system for the motor 114 may be closed-loop and may employ a refrigerant in lieu of the hydrogen gas. Additionally, although not shown, the gas-gas cooler 118 may also or instead be positioned downstream of a discharge outlet 210 of the compressor 112. The hydrogen gas may also be used to cool any other component of the compressor package 102.

Figure 4:
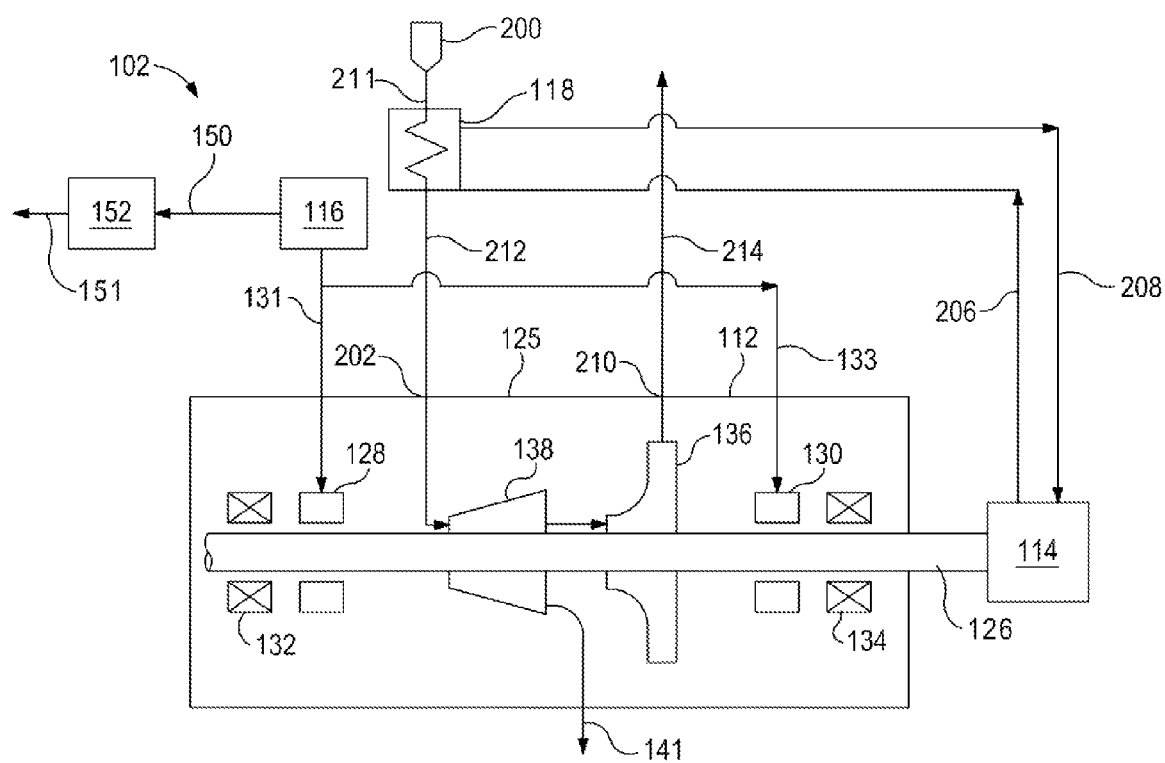
FIG. 4 illustrates a simplified schematic view of an exemplary compression package, according to an embodiment.

FIG. 4 illustrates a simplified schematic view of the compressor 112, the motor 114, and the hydrogen generator 116 of the compression package 102, according to an exemplary embodiment. The compressor 112 includes a casing 125 and a shaft 126 disposed at least partially therein and coupled to the motor 114. Although not shown, in some embodiments, the motor 114 may also be disposed in the casing 125 and, for example, hermetically-sealed therein. Further, the compressor 112 includes one or more dry gas seals (two are shown: 128, 130), which are fluidly coupled to the hydrogen generator 116 via lines 131 and 133, respectively. The dry gas seals 128, 130 are configured to seal with the shaft 126. Additional dry gas seals and/or a variety of other seals (e.g., blow down, gas balance, etc.; not shown) may also be employed. The compressor 112 may also include one or more magnetic bearings (two are shown:

132, 134) configured to levitate and support the shaft 126. In some embodiments, the magnetic bearings 132 may be outboard of the dry gas seals 128, 130, as shown, but in other embodiments may be inboard thereof. Furthermore, in some embodiments, the motor 114 may include magnetic bearings, in addition to or instead of the compressor 112 including the magnetic bearings 132, 134.

In an exemplary embodiment, the compressor 112 also includes one or more impellers 136 mounted to the shaft 126 for rotation therewith to add energy to a process fluid. It will be appreciated that the compressor 112 may be any type of compressor, including any type of axial, reciprocating, screw, or centrifugal compressor and thus may or may not require the impeller 136. A rotary separator 138 for separating a higher density component (e.g., liquids and/or solids) from a lower-density component (e.g., gas) in a multiphase flow may also be coupled to the shaft 126 and in fluid communication with the impeller 136. It will be appreciated that the illustrated positioning and number of dry gas seals 128, 130, magnetic bearings 132, 134, impeller(s) 136, separator(s) 138 is but one example among many contemplated herein that may be employed by one with skill in the art according to a variety of design factors.

Further, the compression package 102 may include a pressurization device 152, such as a compressor, or another type of pressure-boosting device coupled to the hydrogen generator 116 via a line 150 and communicating with the interior 110 (FIG. 1) via a line 151. The pressurization device 152 may be provided by an auxiliary compressor or blower coupled to the shaft 126 or disposed remotely therefrom. In some exemplary embodiments, the auxiliary compressor or blower may be provided in addition to the pressurization device 152 described herein. The auxiliary compressor may require a remote driver (i.e., separate from the motor 114) for startup and/or transient loading, whether coupled to the shaft 126 or disposed separately therefrom.

In operation of the exemplary embodiment, the compression package 102 receives a process fluid via the package inlet 200. This process fluid is introduced to the gas-gas cooler 118 via the line 211, and is used to cool a flow of motor cooling fluid, which may be hydrogen gas, a refrigerant, or any other suitable cooling fluid, received from line 206 and introduced back to the motor 114 via line 208. The process fluid is then introduced to the inlet 202 of the compressor 112 via the line 212. The process fluid directed toward the compressor 112 is first introduced to the separator 138 to separate out the higher density-component via a line 141. The separated higher-density component (e.g., liquid and/or solid particulate matter) may subsequently be introduced to a drainage outlet, which may incorporate the gas break vessels 115, 117 shown in and described above with reference to FIGS. 1 and 2. The remaining lower-density component (e.g., gas) of the process fluid is directed to the impeller 136, where the static pressure of the process fluid is increased by the impeller 136 and an associated diffuser (not shown). The pressurized process fluid is then discharged through the compressor outlet 210 and transported from the compression package 102 via a line 214.

The dry gas seals 128, 130 generally require a source of seal gas to accomplish effective sealing of the shaft 126. In many applications, a portion of the process fluid in the line 214 may be bled off, conditioned, and injected into the dry gas seals 128, 130. However, seals, and particularly dry gas seals, may be sensitive to fouling agents found in the process gas and/or to corrosive properties of the process gas. Accordingly, rather than using process gas as the seal gas, the dry gas seals 128, 130 receive hydrogen gas from the hydrogen generator 116 via the lines 131, 133. As such, instead of ruggedizing the compressor 112 for operation entirely in a natural or sour gas environment, the compressor 112 operates in a relatively pure hydrogen environment, minimizing the size of the caustic or dirty gas boundary and thus the components requiring protection from the process fluid.

Furthermore, non-magnetic bearings (not shown) often require lubricating oil, which can also migrate into the dry gas seals 128, 130 and cause fouling. However, the compressor 112, as shown, includes the magnetic bearings 132, 134 in place of some or all of such standard bearings. The magnetic bearings 132, 134 do not require lubricating oil, and may thus obviate the risk of lubricating oil fouling the dry gas seals 128, 130. The magnetic bearings 132, 134 may, however, be actively controlled via controllers, feedback control loops, position sensors, and the like (none shown). Further, the magnetic bearings 132, 134 may be used in conjunction with catcher bearings and/or other devices to handle a de-levitation of the shaft 126. Further, the motor 114 may also include magnetic bearing systems (not shown).

The hydrogen generator 116 may also supply hydrogen to the interior 110 (FIG. 1) of the compression package 102 via leakage from the dry gas seals 128, 130, or directly, as shown, via a line 150, thereby filling any space between the internal components and the cover 106. Further, the hydrogen generator 116 may be coupled to the pressurizing device 152, which may ensure the hydrogen supplied by the hydrogen generator 116 in line 150 is delivered to the interior 110 (FIG. 1), either via line 151, as shown, or via the dry gas seals 128, 130. The pressurizing device 152 may provide the hydrogen gas at a pressure generally equal to the pressure surrounding exterior to the cover 106 and/or above the pressure in the process gas flowpath (e.g., at the outlet 210) through the compressor 112, as described above. In some embodiments, however, the pressurizing device 152 may be omitted.

Additionally, the magnetic bearings 132, 134 and/or the motor 114 may intake hydrogen from the interior 110 (FIG. 1) or directly from the hydrogen generator 116. For cooling the motor 114, for example, such hydrogen gas may be supplied to and received from the gas-gas cooler 118 via lines 206, 208 to cool the hydrogen gas, as described above. Accordingly, the motor 114 may offload heat into the process gas. In some embodiments, the compression package 102 may also include one or more additional cooling systems to offload heat from the interior 110 (FIG. 1) as produced by the internal components of the compression package 102 and, in such an embodiment, may omit the gas-gas cooler 118.

Figure 5:
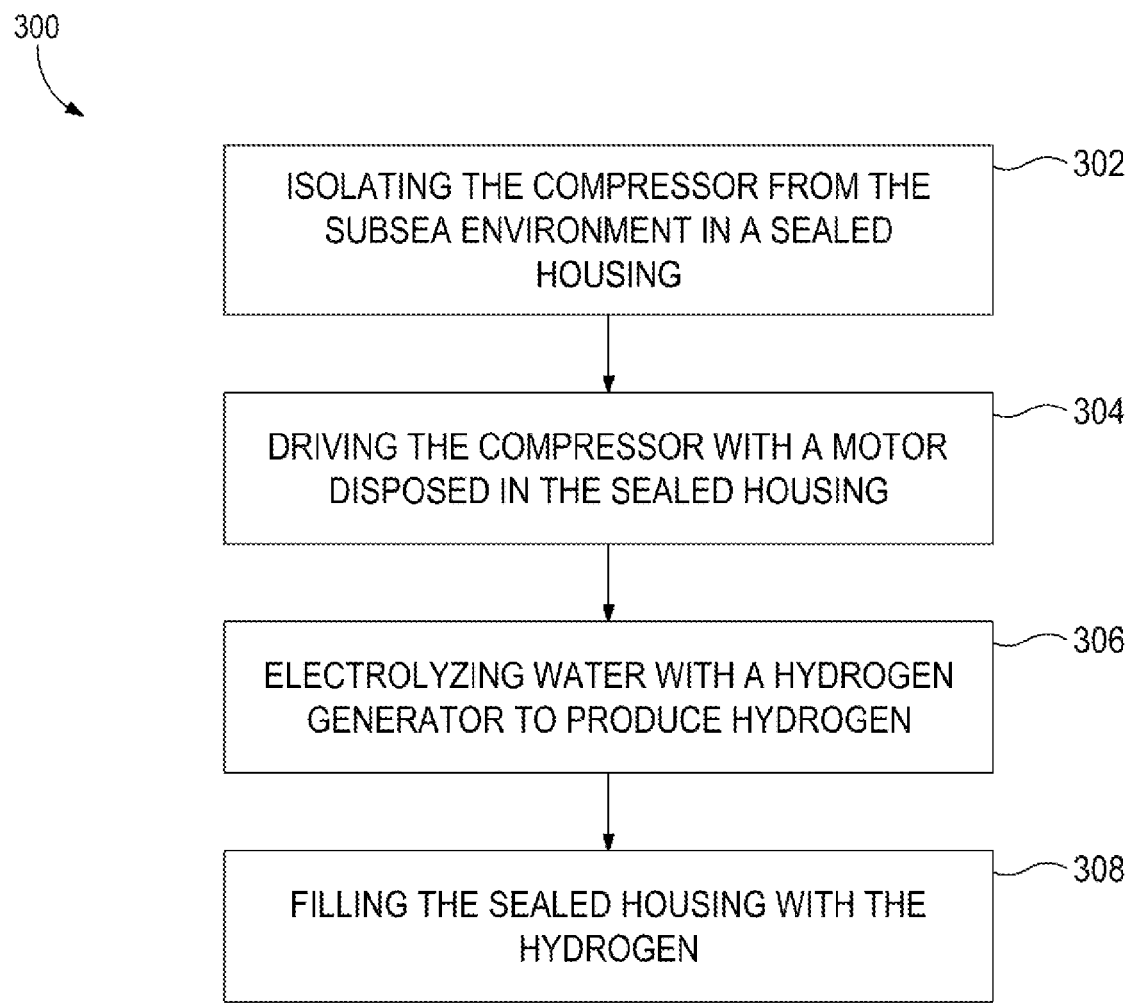
FIG. 5 illustrates a flowchart of a method for subsea operation of a compression system, according to an embodiment.

FIG. 5 illustrates a flowchart of an exemplary method 300 for subsea operation of a compressor. The method 300 may proceed by operation of the exemplary compression system 100 described above and thus may be best understood with reference thereto. The method 300 includes isolating the compressor from a subsea environment by positioning the compressor in a sealed housing, as at 302. The method 300 also includes driving the compressor with a motor disposed in the sealed housing, as at 304. The method 300 further includes electrolyzing water with a hydrogen generator to produce hydrogen, as at 306. The hydrogen generator may be disposed at least partially in the sealed housing or, in another embodiment, may be submerged in the subsea environment and disposed proximate to the sealed housing. The method 300 also includes filling the sealed housing with the hydrogen from the hydrogen generator, as at 308.

The method 300 may also include cooling the motor with a gas-gas cooler configured to receive a process fluid that is compressed by the compressor. Further, cooling the motor may also include receiving hydrogen gas in the motor and supplying the hydrogen to the gas-gas cooler. Additionally, the method 300 may include pressurizing the sealed housing with the hydrogen gas to an internal pressure that is greater than a pressure of a process fluid in an outlet of the compressor. The method 300 may also include pressurizing the sealed housing such that an interior pressure thereof is approximately equal to a pressure external to the sealed housing. The method 300 may further include powering the motor with a VFD disposed external to the sealed housing.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A compression system, comprising:
   a sealed housing configured to be submerged in a body of water;
   a compressor disposed in the sealed housing and including a compressor casing, the compressor being configured to compress a process fluid;
   a motor operably coupled to the compressor and disposed in the sealed housing, the motor being configured to drive the compressor;
   a source of hydrogen disposed in the sealed housing or submerged and disposed proximate thereto, the source of hydrogen being fluidly coupled with the compressor and configured to provide hydrogen gas thereto; and
   a gas-gas cooler configured to transfer heat from the motor to the process fluid, wherein:
   the source of hydrogen is fluidly coupled with the motor and configured to provide hydrogen gas thereto;
   the gas-gas cooler comprises a first flowpath directly fluidly coupled to the compressor, and a second flowpath directly fluidly coupled to the motor;
   the first flowpath is arranged to discharge the process fluid from the gas-gas cooler directly to the compressor;
   the second flowpath is arranged to transport the hydrogen gas directly from the motor to the gas-gas cooler and to discharge the hydrogen gas from the gas-gas cooler directly to the motor; and
   the compressor casing defines a compressor outlet, and the compressor is further configured to discharge the process fluid directly from the sealed housing via the compressor outlet.

2. The compression system of claim 1, wherein the source of hydrogen includes a hydrogen generator fluidly coupled to the body of water and configured to produce the hydrogen gas from water supplied by the body of water.

3. The compression system of claim 1, wherein the compressor includes one or more dry gas seals configured to receive the hydrogen gas from the source of hydrogen.

4. The compression system of claim 1, wherein the source of hydrogen is fluidly coupled to interior of the sealed housing and configured to provide the hydrogen gas thereto.

5. The compression system of claim 4, wherein the source of hydrogen is fluidly coupled with the interior via one or more dry gas seals of the compressor.

6. The compression system of claim 1, wherein at least one of the compressor and the motor includes one or more magnetic bearings.

7. The compression system of claim 1, wherein at least one of the compressor and motor is rated for use at topside pressure.

8. The compression system of claim 1, wherein the motor is configured to intake the hydrogen gas and to provide the hydrogen gas to the gas-gas cooler to cool the motor.

9. The compression system of claim 1, wherein the sealed housing comprises a cover and a stand, the cover being constructed at least partially from composite, steel, or a combination thereof.

10. An apparatus for compressing a process fluid, comprising:
    a sealed housing;
    a compressor disposed in the sealed housing and configured to compress the process fluid;
    a motor disposed in the sealed housing and configured to drive the compressor;
    a hydrogen generator disposed at least partially in or submerged and disposed proximate to the sealed housing and configured to supply hydrogen gas to the compressor and the interior of the sealed housing; and
    a gas-gas cooler configured to transfer heat from the motor to the process fluid, wherein:
    the motor and the compressor are stand-alone units,
    the compressor comprises a compressor outlet,
    the compressor is further configured to discharge the process fluid directly from the sealed housing via the compressor outlet,
    the hydrogen generator is further configured to supply hydrogen gas to the motor,
    the gas-gas cooler comprises a first flowpath directly fluidly coupled to the compressor, and a second flowpath directly fluidly coupled to the motor,
    the first flowpath is arranged to discharge the process fluid from the gas-gas cooler directly to the compressor, and
    the second flowpath is arranged to transport the hydrogen gas directly from the motor to the gas-gas cooler and to discharge the hydrogen gas from the gas-gas cooler directly to the motor.

11. The apparatus of claim 10, wherein the compressor includes an active magnetic bearing.

12. The apparatus of claim 11, wherein the compressor includes one or more dry gas seals configured to receive the hydrogen gas from the hydrogen generator to seal the compressor.

* * * * *